(12) United States Patent
Groenendijk

(10) Patent No.: US 9,057,289 B2
(45) Date of Patent: Jun. 16, 2015

(54) INTERNAL COMBUSTION ENGINE AND METHOD FOR OPERATING AN INTERNAL COMBUSTION ENGINE

(71) Applicant: Axel Groenendijk, Gifhorn (DE)

(72) Inventor: Axel Groenendijk, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/138,016

(22) Filed: Dec. 21, 2013

(65) Prior Publication Data

US 2014/0102390 A1 Apr. 17, 2014

Related U.S. Application Data

(63) Continuation of application No. PCT/EP2012/002593, filed on Jun. 20, 2012.

(30) Foreign Application Priority Data

Jul. 2, 2011 (DE) .......................... 10 2011 106 394

(51) Int. Cl.

| | |
|---|---|
| *F01L 1/34* | (2006.01) |
| *F01L 1/053* | (2006.01) |
| *F01L 1/047* | (2006.01) |
| *F02D 13/02* | (2006.01) |
| *F01L 1/344* | (2006.01) |

(52) U.S. Cl.
CPC .............. *F01L 1/0532* (2013.01); *F01L 1/047* (2013.01); *F01L 1/053* (2013.01); *F01L 1/34* (2013.01); *F01L 2001/0473* (2013.01);
(Continued)

(58) Field of Classification Search
CPC ............. F01L 1/047; F01L 1/053; F01L 1/34; F01L 1/0532; F01L 2001/0473; F01L 2001/34493; F02D 13/0269; F02D 13/0215; F02D 13/0257; F02D 13/0265; F02D 2013/0292
USPC .................................. 123/90.15, 90.17, 90.31
See application file for complete search history.

(56) References Cited

U.S. PATENT DOCUMENTS 5,305,719 A * 4/1994 Clarke et al. ................ 123/90.17
2009/0229548 A1 9/2009 Groenendijk et al.

FOREIGN PATENT DOCUMENTS

| | | |
|---|---|---|
| DE | 19526888 A1 | 1/1997 |
| DE | 102006042912 A1 | 3/2008 |

(Continued)

OTHER PUBLICATIONS

Search Report issued by the German Patent and Trademark Office for German Patent Application No. DE 10 2011 106 394.7, dated Jun. 19, 2012.

(Continued)

Primary Examiner — Zelalem Eshete
(74) Attorney, Agent, or Firm — Manfred Beck, P.A.

(57) ABSTRACT

An internal combustion engine has a working cylinder with two intake valves and two exhaust valves assigned thereto. A first camshaft and a second camshaft each actuate a respective one of the intake valves and a respective one of the exhaust valves. The first camshaft is a variable camshaft with an adjuster for adjusting valve control times and includes an outer shaft, which is a hollow shaft, and an inner shaft, which is disposed within the outer shaft. The outer shaft as well as the inner shaft are rotatable by the adjuster and are rotatable relative to one another by the adjuster such that relative positions of given cams controlling given ones of the intake and exhaust valves are changeable. The second camshaft is driven by a crankshaft of the internal combustion engine and is configured as a fixed camshaft.

4 Claims, 3 Drawing Sheets

(52) U.S. Cl.
CPC .. *F01L 2001/34493* (2013.01); *F02D 13/0257* (2013.01); *F02D 13/0269* (2013.01); *F02D 13/0215* (2013.01); *F02D 13/0265* (2013.01); *F02D 2013/0292* (2013.01); *Y02T 10/142* (2013.01)

(56) References Cited

FOREIGN PATENT DOCUMENTS

| DE | 102007017514 A1 | 10/2008 |
|---|---|---|
| DE | 102008004059 A1 | 7/2009 |
| DE | 102010051832 A1 | 5/2012 |
| EP | 2048331 A2 | 4/2009 |
| GB | 2472054 A | 1/2011 |

OTHER PUBLICATIONS

International Search Report for International Application No. PCT/EP2012/002593 and translation thereof, dated Sep. 13, 2012.
International Preliminary Report on Patentability for International Application No. PCT/EP2012/002593 including Written Opinion of the International Searching Authority and translation thereof, dated Jan. 7, 2014.

* cited by examiner

INTERNAL COMBUSTION ENGINE AND METHOD FOR OPERATING AN INTERNAL COMBUSTION ENGINE

CROSS-REFERENCE TO RELATED APPLICATIONS

This application is a continuation, under 35 U.S.C. §120, of copending International Application No. PCT/EP2012/002593, filed Jun. 20, 2012, which designated the United States; this application also claims the priority, under 35 U.S.C. §119, of German Patent Application No. DE 10 2011 106 394.7, filed Jul. 2, 2011; the prior applications are herewith incorporated by reference in their entirety.

BACKGROUND OF THE INVENTION

Field of the Invention

The invention relates to an internal combustion engine, in particular a diesel internal combustion engine, in particular of a motor vehicle, and to a method for operating such an internal combustion engine having at least one working cylinder, which has at least one intake valve and one exhaust valve assigned thereto and in which a reciprocating piston is moved in an oscillating manner between a top dead center (TDC) and a bottom dead center (BDC), wherein the reciprocating piston alternately with a charge exchange stroke, which includes an exhaust cycle and an intake cycle, and a power stroke, which includes a compression cycle and a power cycle, drives a crankshaft, wherein in dependence of a crankshaft angle the intake valves and exhaust valves are opened and closed in the charge exchange stroke of the reciprocating piston. The intake valves and exhaust valves are operated in this case by the cams of a so-called "mixed" camshaft.

The use of a mixed camshaft makes it possible to lower the compression in the working cylinder in that, after a bottom dead center BDC at the end of the charge exchange stroke, the closing time of at least one intake valve is shifted so far to late, such that a part of the amount of fresh gas, which has been sucked in earlier in the intake cycle, is expelled again through this intake valve in the compression cycle. This way of operating an internal combustion engine is also referred to by the term "Miller cycle." The positive effect of the Miller cycle on the $NO_x$ emission and the homogenizability of a diesel-air mixture is known. As a result of operating the internal combustion engine in the Miller cycle, the charge of the working cylinder however deteriorates in principle. This disadvantage can be compensated by a charging of the fresh gas by means of, for example, a turbocharger or a compressor. In this case, for example the charging pressure in the volume between the outlet of a turbocharger and the intake of the internal combustion engine is controlled so that the charging pressure in each Miller operating point, i.e. in each operating point, in which the "Miller cycle" is used, corresponds to the theoretical compression final pressure in the working cylinders of the internal combustion engine at the time "intake valve doses." For the closed loop control, optionally also open loop control, pressure sensors and/or temperature sensors and/or mass flow sensors or expedient combination sensors of the three above-mentioned sensor types are used.

A diesel internal combustion engine with a variable valve control, which can be operated in accordance with the Miller cycle, is known from German Patent Application Publication No. DE 10 2006 042 912 A1.

SUMMARY OF THE INVENTION

It is accordingly an object of the invention to provide an improved internal combustion engine, which overcomes the above-mentioned disadvantages of the heretofore-known internal combustion engines of this general type. In particular, the internal combustion engine should be characterized by an improved operating behavior and/or by a higher efficiency. Another object of the invention is to provide a method for operating an internal combustion engine.

With the foregoing and other objects in view there is provided, in accordance with the invention, an internal combustion engine, including:

a working cylinder having two intake valves and two exhaust valves assigned thereto;

a first camshaft and a second camshaft each actuating a respective one of the intake valves and a respective one of the exhaust valves;

the first camshaft being configured as a variable camshaft with an adjuster for adjusting valve control times;

the first camshaft including an outer shaft and an inner shaft, the outer shaft being configured as a hollow shaft, the inner shaft being disposed within the outer shaft, the outer shaft and the inner shaft each including at least a respective one of a plurality of cams;

the outer shaft as well as the inner shaft being rotatable by the adjuster, the outer shaft and the inner shalt being rotatable relative to one another by the adjuster such that relative positions of given ones of the cams controlling given ones of the intake and exhaust valves are changeable; and a crankshaft, the second camshaft being driven by the crankshaft, and the second camshaft being configured as a fixed camshaft.

In other words according to the invention, there is provided an internal combustion engine including a working cylinder, wherein the working cylinder has in each case two intake valves and two exhaust valves assigned thereto, wherein a first and a second camshaft actuate in each case an intake valve and an exhaust valve, wherein the first camshaft is configured as a variable camshaft with an adjuster for adjusting the valve control times and includes an outer shaft configured as a hollow shaft and an inner shaft disposed within the outer shaft, wherein the outer and the inner shaft in each case include at least one of the cams, and wherein both the outer and the inner shaft are rotatable through the use of the adjuster, and the outer shaft and the inner shaft are rotatable relative to one another through the use of the adjuster, such that the relative positions of the cams controlling the intake and exhaust valves are changeable, wherein the second camshaft is driven by a crankshaft of the internal combustion engine and is configured as a fixed camshaft.

According to another feature of the invention, the fixed camshaft is deactivatable.

With the objects of the invention in view there is also provided, a method for operating an engine, including the steps of:

providing an internal combustion engine having a working cylinder with two intake valves and two exhaust valves assigned thereto, the internal combustion engine having a first camshaft and a second camshaft each actuating a respective one of the intake valves and a respective one of the exhaust valves, the first camshaft being configured as a variable camshaft with an adjuster for adjusting valve control times, the first camshaft including an outer shaft and an inner shaft, the outer shaft being configured as a hollow shaft, the inner shaft being disposed within the outer shaft, the outer shaft and the inner shaft each including at least a respective one of a plurality of cams, the outer shaft as well as the inner shaft being rotatable by using the adjuster, the outer shaft and the inner shaft being rotatable relative to one another by using the adjuster such that relative positions of given ones of the cams controlling given ones of the intake and exhaust valves are changeable, the second camshaft being driven by a crankshaft of the internal combustion engine, and the second camshaft being configured as a fixed camshaft; and operating the internal combustion engine in at least one operating range selected from the group consisting of a first operating range, a second operating range and a third operating range, wherein in the first operating range, which is characterized by medium to high loads and low to medium rotational speeds of the internal combustion engine, valve control times of the respective ones of the intake and exhaust valves actuated by the variable camshaft substantially correspond to valve control times of the intake and exhaust valves actuated by the fixed camshaft, wherein in the second operating range, which is in comparison to the first operating range characterized by higher rotational speeds of the internal combustion engine, valve control times of the respective one of the intake valves actuated by the variable camshaft are adjusted to late and valve control times of the respective one of the exhaust valves are adjusted to early, and wherein in the third operating range, which is characterized by low to medium loads of the internal combustion engine, valve control times of the respective one of the exhaust valves actuated by the variable camshaft substantially correspond to valve control times of the respective one of the exhaust valves actuated by the fixed camshaft and valve control times of the respective one of the intake valves actuated by the variable camshaft are adjusted to late.

In other words, according to the invention, there is provided method for operating an internal combustion engine as defined above, wherein in a first operating range, which is characterized by medium to high loads and low to medium rotational speeds of the internal combustion engine, the control times of the intake and exhaust valves actuated by the variable camshaft essentially correspond to the control times of the intake and exhaust valves actuated by the fixed camshaft; and/or in a second operating range, which is in comparison to the first operating range characterized by higher rotational speeds of the internal combustion engine, the control times of the intake valve actuated by the variable camshaft are adjusted to late and the control times of the exhaust valve are adjusted to early; and/or in a third operating range, which is characterized by low to medium loads of the internal combustion engine, the control times of the exhaust valve actuated by the variable camshaft essentially correspond to the control times of the exhaust valve actuated by the fixed camshaft, and the control times of the intake valve actuated by the variable camshaft are adjusted to late.

Another mode of the invention, includes the steps of adjusting valve control times of the respective one of the intake valves actuated by the variable camshaft to early and adjusting valve control times of the respective one of the exhaust valves to late in a cold running of the internal combustion engine; and deactivating the fixed camshaft.

The invention is based on the idea that in case of an internal combustion engine according to German Patent Application Publication No. DE 10 2006 042 912 A1 the opening duration of the exhaust valve, which is adjustable by using the variable camshaft, must necessarily be reduced (as compared to an internal combustion engine with fixed control times) in order to prevent, in case of an adjustment of the intake valve to late, a collision of the piston of the internal combustion engine with the exhaust valve which is necessarily adjusted to late together with the intake valve. In particular during an operation of the internal combustion engine at high rotational speeds and loads, this may result in scavenging problems, because the total opening duration of the exhaust valves may be too small for a sufficient scavenging of the cylinder.

This disadvantage is to be avoided in accordance with the invention by configuring the variable camshaft such that an adjustment of the control times of the intake valve does not necessarily require a corresponding adjustment of the control times of the exhaust valve.

A generic internal combustion engine thus has at least one working cylinder, which has at least in each case one intake valve and one exhaust valve assigned thereto, and has at least one camshaft, which is configured as a so-called "mixed camshaft," i.e. this camshaft actuates both at least one exhaust valve and one intake valve. Furthermore, this camshaft is configured as a variable camshaft, i.e. it has an adjuster through the use of which the valve control times of the intake and exhaust valves are adjustable. The generic internal combustion engine is therefore improved in accordance with the invention in that the relative position of the cams, which control the intake and exhaust valves, is changeable, i.e. adjustable.

By adjusting the relative position, which the cams occupy with respect to each other on the circumference of the camshaft, it is possible to decouple (within limits) the control times of the intake and exhaust valves, which are actuated by these cams, and thus to adjust them independently from one another. A more targeted influence can thus be exerted on the control times of the individual valves, without resulting in unwanted changes in the control times of individual valves. As a result, through the use of the embodiment of the internal combustion engine in accordance with the invention, the control times of the individual valves can be better adapted to the respective operating state of the internal combustion engine which can result in an improved operating behavior and/or a higher efficiency.

In a preferred embodiment of the internal combustion engine according to the invention, the relative position of the cams controlling the intake and exhaust valves can be changed in that the camshaft includes an outer shaft, which is configured as a hollow shaft, and an inner shaft, which is disposed within the outer shaft and which may also be formed as a solid shaft, wherein the outer and inner shaft in each case have at least one of the cams (preferably fixedly disposed) and wherein the outer and the inner shaft are rotatable relative to one another through the use of the adjuster. Such a camshaft allows an adjustment of the relative position of the cams with a relatively small construction outlay.

In an embodiment of the internal combustion engine according to the invention it can be provided that, through the use of the adjuster and the configuration of the variable camshaft in accordance with the invention, an adjustment of the control times of only one or more intake or exhaust valves is carried out and the control times of the other valve or valves are not changeable. Already through the use of this relatively simple development, the disadvantage known from the above-mentioned German Patent Application Publication No. DE 10 2006 042 912 A1 can be avoided by, for example, adjusting only the control times of the intake valve or valves to late, without changing at the same time the control times of the exhaust valve or valves. Thus, it is no longer necessary to reduce the opening duration of an exhaust valve controlled by the variable camshaft compared to the opening duration of an exhaust valve controlled by a fixed camshaft.

In such a configuration of the internal combustion engine according to the invention it may preferably be provided that the adjustment of the control times of only the intake valve or exhaust valve is achieved in that (only) the inner shaft with the cam connected thereto is rotated through the use of the adjuster. Compared to a configuration that is also possible, in which (only) the outer shaft is rotated through the use of the adjuster, this can have the advantage that the adjuster is made smaller, since the arrangement of the inner shaft in the outer shaft allows for a comparatively low-friction bearing that therefore requires only a correspondingly low torque for the rotation.

Now the adjustment of the control times of the exhaust valve can however also have advantages—in spite of the required reduction in the opening duration in the case of the internal combustion engine according to DE 10 2006 042 912 A1—because with the overlap of the control times of the exhaust valves actuated by the variable camshaft and a fixed camshaft, an overall increase in the opening duration for the combustion chamber can be achieved. This allows an improved charge exchange in the working cylinder.

A particularly preferred embodiment of the internal combustion engine according to the invention now makes it possible to achieve this advantage of the overlap of the valve control times even without the disadvantage of the reduced opening duration of the exhaust valve actuated by the variable camshaft. Specifically, this embodiment provides that both the outer shaft and the inner shaft of the variable camshaft are rotatable through the use of the adjuster, and, to be precise, independently from one another, or at least without a coupling such that both are rotated in the same direction.

This configuration is in particular preferably combined with a development of the internal combustion engine according to the invention, in which the working cylinder has (at least) two intake valves and (at least) two exhaust valves assigned thereto, wherein (at least) two camshafts are provided, each of which is configured as a mixed camshaft, i.e. each of the camshafts actuates in each case at least one intake valve and one exhaust valve.

Specifically, this particularly preferred embodiment allows, in an operating state of the internal combustion engine, adjusting the control times of the intake valve of the variable camshaft to late and adjusting those of the exhaust valve of the variable camshaft to early. Thus, the advantages of a late intake dosing can be combined, in particular in a Miller cycle with a valve overlap of the exhaust valves, without having to accept a shorter opening duration of the exhaust valve on the side of the variable camshaft.

Such a configuration of the internal combustion engine according to the invention allows its operation in accordance with a method according to the invention in which there is provided, in a first operating range, which is in particular characterized by medium to high loads and low to medium rotational speeds of the internal combustion engine, to let the control times of the intake and exhaust valves actuated by the variable camshaft essentially correspond to the control times of the intake and exhaust valves actuated by the fixed camshaft and/or in a second operating range, which compared to the first operating range is characterized by higher rotational speeds (at the respective loads) of the internal combustion engine, to adjust the control times of the intake valve actuated by the variable camshaft to early and the control times of the exhaust valve to late. The operating behavior and/or the efficiency in various operating states of the internal combustion engine can thus be improved. Further, in a third operating range, which is characterized by low to medium loads of the internal combustion engine, the control times of the exhaust valve actuated by the variable camshaft can essentially correspond to the control times of the exhaust valve actuated by the fixed camshaft and the control times of the intake valve actuated by the variable camshaft (18) are adjusted to late.

Preferably it may be further provided that in a fourth operating range, which is characterized by a cold-running of the internal combustion engine (i.e. the internal combustion engine has not yet reached its operating temperature (range)), the control times of the intake valve actuated by the variable camshaft are adjusted to early and the control times of the exhaust valve are adjusted to late and the fixed camshaft is deactivated (i.e. the valves that are "normally" actuated by it remain closed). This fourth operating range of the internal combustion engine is preferably (only) provided at very low to medium rotational speeds and at very low to low loads.

A corresponding internal combustion engine according to the invention is characterized by the possibility of being able to deactivate the fixed camshaft. This can be accomplished in accordance with any of the configurations that are known in the prior art. For example, a decoupling of the entire camshaft can be provided or there is a deactivation of individual or all of the rocker arms or hydraulic tappets via which the valves are actuated by the cams of the camshaft.

Other features which are considered as characteristic for the invention are set forth in the appended claims.

Although the invention is illustrated and described herein as embodied in an internal combustion engine and a method for operating an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
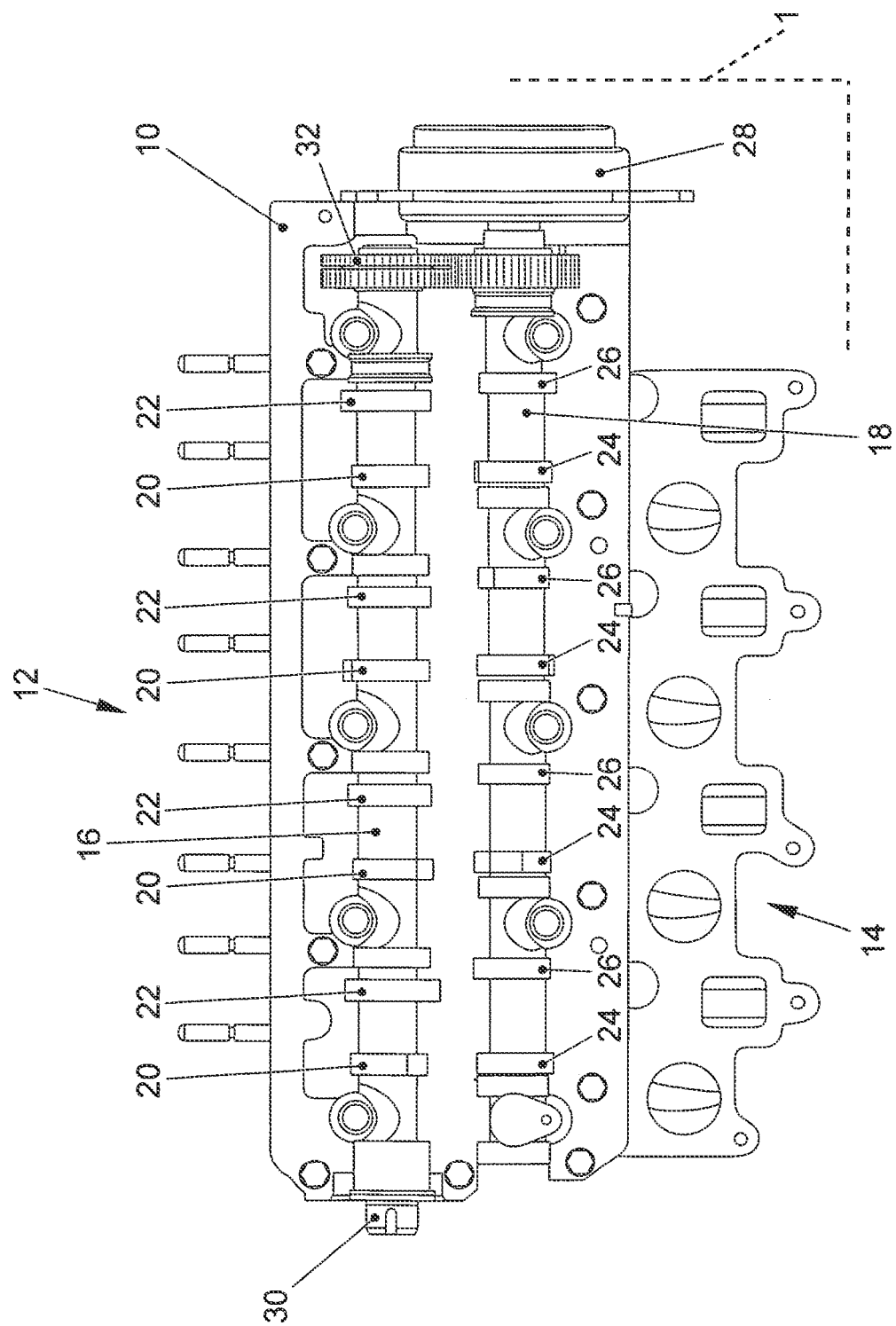
FIG. 1 is a diagrammatic plan view of an embodiment of an internal combustion engine according to the invention.

Referring now to the figures of the drawings in detail and first, particularly, to FIG. 1 thereof, there is shown an embodiment of an internal combustion engine according to the invention. The internal combustion engine, which has working cylinders and a crankshaft, is schematically indicated by a broken line 1. The internal combustion engine according to the invention includes a cylinder head 10 having working cylinders integrated therein, in which in each case a reciprocating piston moves in an oscillating manner between a top dead center (TDC) and a bottom dead center (BDC). The cylinder head 10 includes an exhaust side 12, on which exhaust gases are discharged from the working cylinders, and an intake side 14, on which fresh gas is supplied to the working cylinders.

Each working cylinder has two intake valves and two exhaust valves assigned thereto, wherein a fixed camshaft 16 and a variable camshaft 18 are provided. The fixed camshaft 16 carries intake cams 20, which actuate in each case a respective intake valve, and exhaust cams 22, which actuate in each case a respective exhaust valve. Likewise, the variable camshaft 18 carries intake cams 24, which actuate in each case a respective intake valve, and exhaust cams 26, which actuate in each case a respective exhaust valve. On both camshafts 16, 18 (when viewed in the longitudinal direction) respective intake cams 20, 24 and respective exhaust cams 22, 26 alternate with one another. In this way the two intake valves and exhaust valves of each working cylinder are actuated by different camshafts 16, 18. Thus, each of the camshafts 16, 18 is a so-called mixed camshaft, i.e. each camshaft 16, 18 actuates both the intake and the exhaust valves via corresponding intake cams 20, 24 and, respectively, exhaust cams 22, 26.

The control times of the intake and exhaust valves assigned to the fixed camshaft 16 are unchangeably set. At the variable camshaft 18 there is disposed an adjuster 28, through the use of which the control times of the intake and exhaust valves assigned to the variable camshaft 18 can be changed by rotating the second camshaft 18 with the adjuster 28. At a location indicated by reference character 30, the fixed camshaft 16 is driven by a crankshaft of the internal combustion engine. The fixed camshaft 16 then in turn drives, via gearwheels 32, the variable camshaft 18.

The variable camshaft 18 is configured according to the invention such that it can change the control times of the intake and exhaust valves, which are actuated by it, separately from one another. For this purpose, the variable camshaft 18 includes an outer shaft 34, which is configured as a hollow shaft, and an inner shaft 36, which is configured as a solid shaft (see FIG. 2). The inner shaft 36 is in this case provided with a total of four intake cams 20 which actuate the corresponding intake valve of each of the working cylinders. In this case, the intake cams are in each case guided in an elongated opening of the outer shaft 34, the opening being oriented in the circumferential direction, to allow a relative rotation of the outer shaft 34 with respect to the inner shaft 36. The outer shaft 34 carries four exhaust cams 22 which actuate the exhaust valves assigned thereto. The adjuster 28 is configured as a double-acting adjuster, as is shown schematically in FIG. 2. This allows adjusting the inner shaft 36 and the outer shaft 34 independently of one another by a defined angle range with respect to the (rotational) relative position of the two camshafts 16, 18 which is set by the coupling via the gearwheels 32. In this case it is provided to rotate the inner shaft 36, which actuates the corresponding intake valves, by an adjustment angle of, for example, maximally 50° and to rotate the outer shaft 34, which actuates the respective exhaust valves, by an adjustment angle of maximally −30° relative to a starling position (relative to the fixed camshaft 16).

Figure 2:
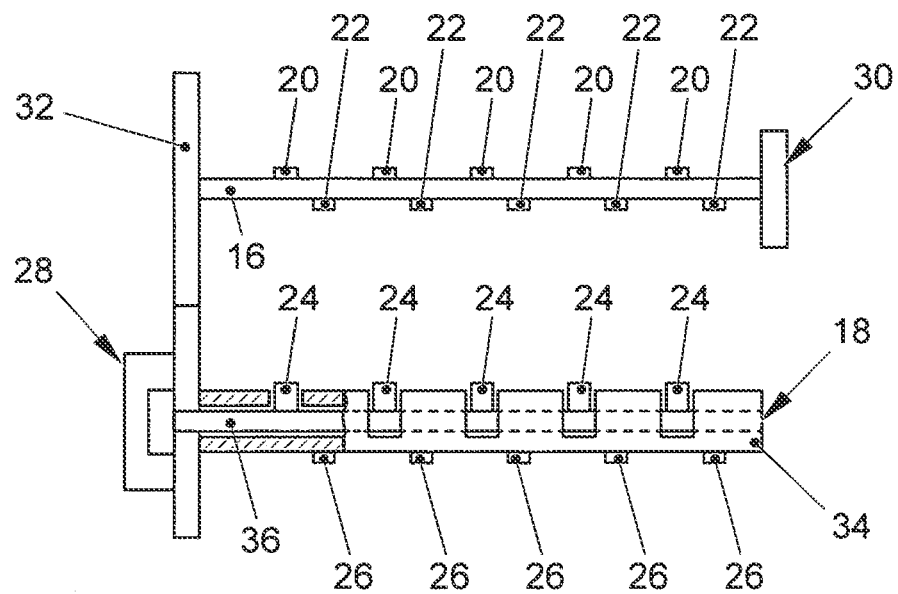
FIG. 2 is a schematic representation of the camshaft configuration of the internal combustion engine in accordance with FIG. 1.

FIGS. 3 to 6 show different adjustment positions for the internal combustion engine according to the invention pursuant to FIGS. 1 and 2. In this case, a crankshaft angle (in ° CA) is in each case plotted on the horizontal axis and a lifting movement (in mm) is plotted on the vertical axis. A first graph 38 shows the lifting movement against the crankshaft angle for those exhaust valves that are controlled by the exhaust cams 22 of the fixed camshaft 16. A second graph 40 (broken line) shows the lifting movement against the crankshaft angle for those exhaust valves that are controlled by the exhaust cams 26 of the variable camshaft 18. A third graph 42 shows the lifting movement against the crankshaft angle for those intake valves which are controlled by the intake cams 20 of the fixed camshaft 16 and a fourth graph 44 (broken line) shows the lifting movement against the crankshaft angle for those intake valves that are controlled by the intake cams 24 of the variable camshaft 18.

Figure 3:
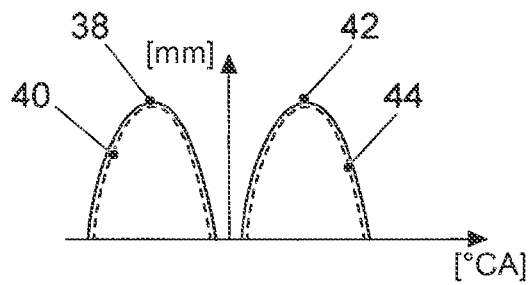
FIG. 3 is a graphical representation of the valve movements of the intake and exhaust valves of the internal-combustion engine in accordance with FIGS. 1 and 2 in a first adjustment position of the variable camshaft.

In FIG. 3, an adjustment position of the variable camshaft 18 with an adjustment angle for the outer shaft 34 and the inner shaft 36 of respectively 0° CA is shown, i.e. the camshafts 16, 18 are considered as not rotated against one another. In this adjustment position, the intake and exhaust valves actuated by the two camshafts 16, 18 open and close approximately at the same time and thus also have an almost identical opening duration. In addition, the cam shape of the individual cams is such that there is (approximately) the same maximum lift for all valves (the minor difference in the lifting movements of the intake and exhaust valves shown in FIGS. 3 to 6 is provided only for the sake of improved clarity).

The adjustment position shown in FIG. 3 can for example be provided for the operation of the internal combustion engine in a first operating range 46, which is characterized by low to high loads and low to medium rotational speeds. This is illustrated in FIG. 7, which shows an operating characteristic map (load M against the rotational speed n) of the internal combustion engine.

Figure 4:
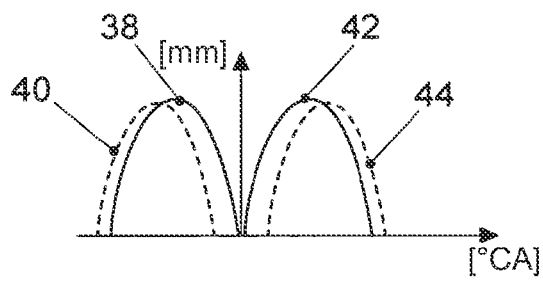
FIG. 4 is a graphical representation of the valve movements of the intake and exhaust valves in a second adjustment position of the variable camshaft in accordance with the invention.

In FIG. 4, an adjustment position of the variable camshaft 18 is shown, in which the outer shaft 34, which controls the exhaust valves, is rotated so that there is a shift of the control times of the exhaust valves, which are actuated by it, to "early" and in which the inner shaft 36, which controls the intake valves, is rotated such that there is a shift of the control times of the intake valves, which are actuated by it, to "late." In this case it is provided to have an adjustment to late for the intake valves with small to medium values (in relation to the maximum possible values).

Figure 7:
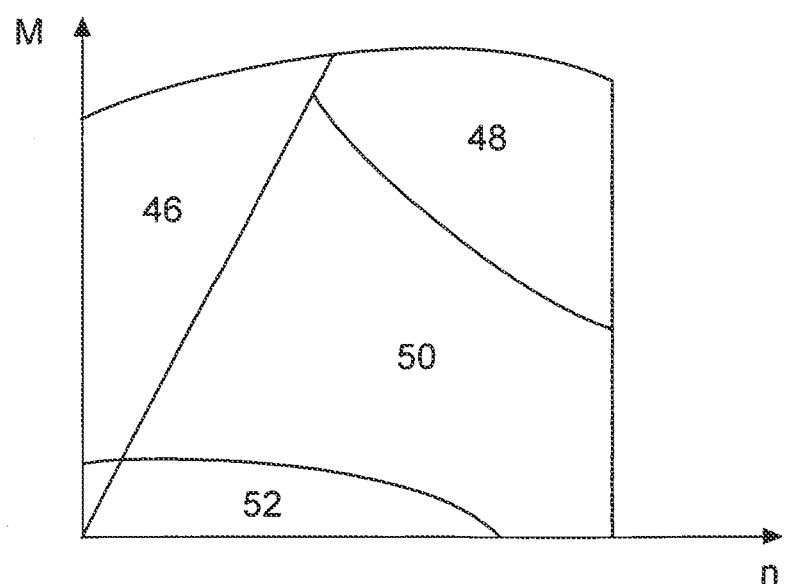
FIG. 7 is a graph for illustrating an allocation of the adjustment positions according to FIGS. 3 to 6 in an operating characteristic map of the internal combustion engine in accordance with the invention.

The adjustment position shown in FIG. 4 can for example be provided for the operation of the internal combustion engine in a second operating range 48, which is characterized by medium to high loads and medium to high rotational speeds (see FIG. 7).

Figure 5:
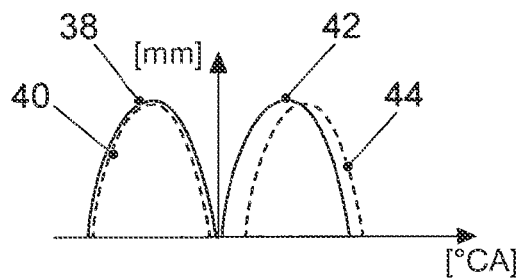
FIG. 5 is a graphical representation of the valve movements of the intake and exhaust valves in a third adjustment position of the variable camshaft in accordance with the invention.

In FIG. 5, an adjustment position of the variable camshaft 18 is shown, in which the outer shaft 34, which controls the exhaust valves, has an adjustment angle of 0°, while the inner shaft 36, which controls the intake valves, is rotated such that there is a shift of the control times of the intake valves, which are actuated by it, to late. In this case it is provided to have an adjustment to late for the intake valves with medium to maximum values.

The adjustment position shown in FIG. 5 can for example be provided for the operation of the internal combustion engine in a third operating range 50, which covers all of the remaining operating states of the internal combustion engine that are not covered by the first and second operating range 46, 48 of the internal combustion engine (see FIG. 7).

Figure 6:
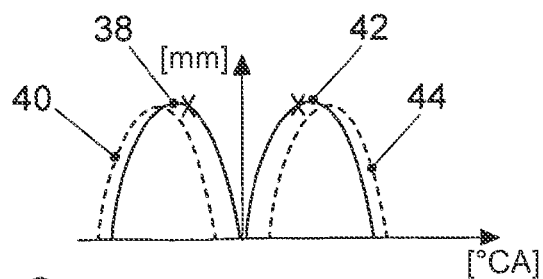
FIG. 6 is a graphical representation of the valve movements of the intake and exhaust valves in a fourth adjustment position of the variable camshaft in accordance with the invention.

In FIG. 6, a further operating mode of the internal combustion engine is shown, which is only selected in a cold-running condition of the internal combustion engine, i.e. if it has not yet reached its operating temperature. For this operating mode of the internal combustion engine, a fourth operating range 52 is provided, which is located in a portion of the first 46 and third 50 operating range. In this fourth operating range 52, an adjustment of the intake and exhaust valves, which are adjustable by the variable camshaft, is carried out in accordance with the adjustment which is provided for the second operating range 48. In addition, there is a deactivation of the valves controlled by the fixed camshaft 16 (indicated by a crossed out valve path for the valves, see FIG. 7).

LIST OF REFERENCE CHARACTERS 1 internal combustion engine
10 cylinder head
12 exhaust side
14 intake side
16 fixed camshaft
18 variable camshaft
20 intake cams of the fixed camshaft
22 exhaust cams of the variable camshaft
24 intake cams of the fixed camshaft
26 exhaust cams of the variable camshaft
28 adjuster
30 drive
32 gearwheel
34 outer shaft
36 inner shaft
38 lifting movement: fixed exhaust valve
40 lifting movement: variable exhaust valve
42 lifting movement: fixed intake valve
44 lifting movement: variable intake valve
46 first operating range
48 second operating range
50 third operating range
52 fourth operating range

What is claimed is:

1. An internal combustion engine, comprising:
   a working cylinder having two intake valves and two exhaust valves assigned thereto;
   a first camshaft and a second camshaft each actuating a respective one of said intake valves and a respective one of said exhaust valves;
   said first camshaft being configured as a variable camshaft with an adjuster for adjusting valve control times;
   said first camshaft including an outer shaft and an inner shaft, said outer shaft being configured as a hollow shaft, said inner shaft being disposed within said outer shaft, said outer shaft and said inner shaft each including at least a respective one of a plurality of cams;
   said outer shaft as well as said inner shaft being rotatable by said adjuster, said outer shaft and said inner shaft being rotatable relative to one another by said adjuster such that relative positions of given ones of said cams controlling given ones of said intake and exhaust valves are changeable; and
   a crankshaft, said second camshaft being driven by said crankshaft, and said second camshaft being configured as a fixed camshaft, wherein control times of the respective one of said intake valves and of the respective one of said exhaust valves assigned to said fixed camshaft are unchangeably set.

2. The internal combustion engine according to claim 1, wherein said fixed camshaft is deactivatable.

3. A method for operating an engine, the method which comprises:
   providing an internal combustion engine having a working cylinder with two intake valves and two exhaust valves assigned thereto, the internal combustion engine having a first camshaft and a second camshaft each actuating a respective one of the intake valves and a respective one of the exhaust valves, the first camshaft being configured as a variable camshaft with an adjuster for adjusting valve control times, the first camshaft including an outer shaft and an inner shaft, the outer shaft being configured as a hollow shaft, the inner shaft being disposed within the outer shaft, the outer shaft and the inner shaft each including at least a respective one of a plurality of cams, the outer shaft as well as the inner shaft being rotatable by using the adjuster, the outer shaft and the inner shaft being rotatable relative to one another by using the adjuster such that relative positions of given ones of the cams controlling given ones of the intake and exhaust valves are changeable, the second camshaft being driven by a crankshaft of the internal combustion engine, and the second camshaft being configured as a fixed camshaft; and
   operating the internal combustion engine in at least one operating range selected from the group consisting of a first operating range, a second operating range and a third operating range, wherein in the first operating range, which is characterized by medium to high loads and low to medium rotational speeds of the internal combustion engine, valve control times of the respective ones of the intake and exhaust valves actuated by the variable camshaft substantially correspond to valve control times of the intake and exhaust valves actuated by the fixed camshaft, wherein in the second operating range, which is in comparison to the first operating range characterized by higher rotational speeds of the internal combustion engine, valve control times of the respective one of the intake valves actuated by the variable camshaft are adjusted to late and valve control times of the respective one of the exhaust valves are adjusted to early, and wherein in the third operating range, which is characterized by low to medium loads of the internal combustion engine, valve control times of the respective one of the exhaust valves actuated by the variable camshaft substantially correspond to valve control times of the respective one of the exhaust valves actuated by the fixed camshaft and valve control times of the respective one of the intake valves actuated by the variable camshaft are adjusted to late.

4. The method for operating an engine according to claim 3, which comprises:
   adjusting valve control times of the respective one of the intake valves actuated by the variable camshaft to early and adjusting valve control times of the respective one of the exhaust valves to late in a cold running of the internal combustion engine; and
   deactivating the fixed camshaft.

* * * * *